(No Model.)

J. D. DAVIES.
CABLE SHEAVE.

No. 411,761.          Patented Sept. 24, 1889.

Attest
Ed. Strehli
Jesse R. Law

Inventor
Joseph D. Davies
Strehli & Hill
by          Att'ys.

UNITED STATES PATENT OFFICE.

JOSEPH D. DAVIES, OF CINCINNATI, OHIO, ASSIGNOR OF ONE-HALF TO HENRY MARTIN, OF SAME PLACE.

CABLE-SHEAVE.

SPECIFICATION forming part of Letters Patent No. 411,761, dated September 24, 1889.

Application filed November 10, 1888. Serial No. 290,504. (No model.)

*To all whom it may concern:*

Be it known that I, JOSEPH D. DAVIES, a citizen of the United States, residing at Cincinnati, in the county of Hamilton, State of Ohio, have invented certain new and useful Improvements in Cable-Sheaves, of which the following is a specification.

The object of my invention is to so construct a sheave that the central portion of the periphery of the sheave which is subject to wear may be removed and a new filling placed therein.

Figure 1:
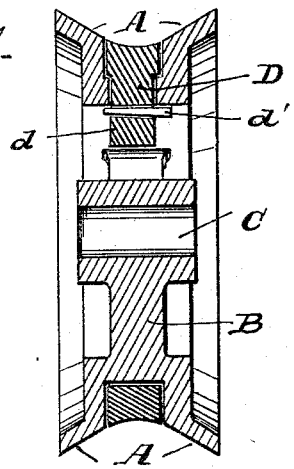
Figure 2:
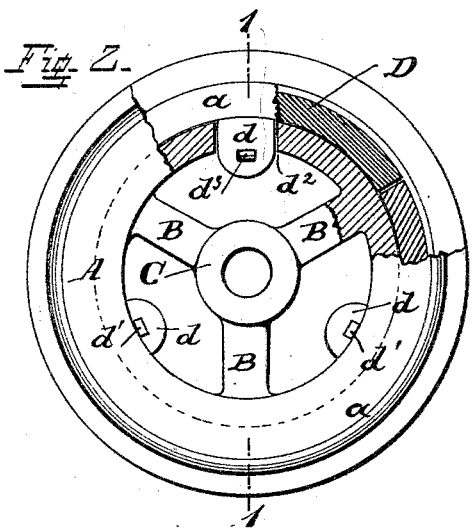
Figure 3:
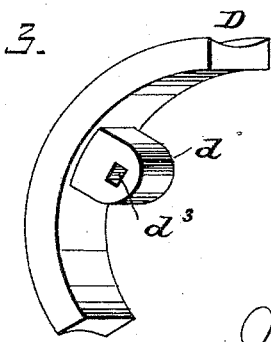

In the drawings accompanying this application and forming a part thereof, Figure 1 is a central section taken at the line 1 1, Fig. 2. Fig. 2 is a view in side elevation of a sheave embodying my invention, a part of the outer shell being broken away, showing a part of the detachable segments in position. Fig. 3 is a perspective view of one of the detachable segmental fillings.

My invention, as preferably constructed, consists in casting the sheave proper with the ordinary hub C, arms B, and flanges A. The outer flanges A are so cast as to form a circular recess $a$ between them, the walls of said recess preferably being vertical. In the bottom portion of the circular flanges A, and at suitable intervals therein, are openings $d^2$, through which the projections $d$ of the segments D pass, as shown in Figs. 1 and 2.

In the drawings I have shown the sheave with three segmental fillings D; but if desired this number may be increased or diminished. It is preferred to have the segments join on a line radial with the arms B, so that the retaining-lug $d$, which is centrally attached to the segments, may pass through the openings $d^2$ between said arms.

After the segments are placed in position in the sheave proper a suitable wedge $d'$ is driven into the opening $d^3$ of projection $d$, which wedge preferably fits up tight against the inner face of the flanges A, as shown in Fig. 2, holding the segment D firmly to place. Any other suitable mechanism may be employed for retaining said segments to place in connection with the sheave proper.

My invention is applicable to other sheaves than that herein specifically shown and described, but is especially applicable to cable-sheaves where the same are subjected to a constant wear. So soon as these segments are worn out, all that is necessary is simply to take out the old segments and replace them with new ones, which can be readily done without removing the sheave proper from the conduit and in a very short time.

The advantages of my invention are apparent. In the ordinary sheave when the flange of same is worn through the entire sheave must be thrown away and a new one put to place, whereas in my improved sheave all that is necessary is simply to replace new segments, which can be done at a cost much less than a new sheave.

What I claim as new, and desire to secure by Letters Patent, is—

In combination with the sheave proper, having outer circular flanges A and a recess $a$ between them, the bottom connecting portion of said flanges having openings $d^2$, the segments D, having projections $d$, said projections having an opening $d^3$, through which a wedge $d'$ is inserted for retaining the segments in place, substantially as set forth.

JOSEPH D. DAVIES.

Witnesses:
JNO. W. STREHLI,
O. M. HILL.